US012356245B2

United States Patent
Zhou et al.

(10) Patent No.: US 12,356,245 B2
(45) Date of Patent: Jul. 8, 2025

(54) DATA TRANSMISSION METHOD, APPARATUS, AND SYSTEM

(71) Applicant: HONOR DEVICE CO., LTD., Guangdong (CN)

(72) Inventors: Ming Zhou, Shenzhen (CN); Yuren Xiao, Shenzhen (CN); Haw-Wei Shu, Shenzhen (CN); Tongbo Wang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 343 days.

(21) Appl. No.: 17/801,545

(22) PCT Filed: Oct. 30, 2020

(86) PCT No.: PCT/CN2020/125586
§ 371 (c)(1),
(2) Date: Aug. 23, 2022

(87) PCT Pub. No.: WO2021/169369
PCT Pub. Date: Sep. 2, 2021

(65) Prior Publication Data
US 2023/0147131 A1  May 11, 2023

(30) Foreign Application Priority Data

Feb. 24, 2020 (CN) .......................... 202010115820.0

(51) Int. Cl.
*H04W 28/06* (2009.01)
*H04L 5/00* (2006.01)
*H04W 76/14* (2018.01)

(52) U.S. Cl.
CPC ......... *H04W 28/065* (2013.01); *H04L 5/0044* (2013.01); *H04W 76/14* (2018.02)

(58) Field of Classification Search
CPC ........... H04W 28/065; H04W 72/1215; H04W 84/12; H04W 28/06; H04W 4/70; H04W 28/0278; H04W 76/14; H04L 1/1874
See application file for complete search history.

(56) References Cited

U.S. PATENT DOCUMENTS

| | | | |
|---|---|---|---|
| 7,382,790 B2 | 6/2008 | Warren et al. | |
| 11,438,941 B2 | 9/2022 | Luo et al. | |

(Continued)

FOREIGN PATENT DOCUMENTS

| | | | |
|---|---|---|---|
| CN | 101009865 A | 8/2007 | |
| CN | 107707302 A | 2/2018 | |

(Continued)

OTHER PUBLICATIONS

Ieee Standards Association: "IEEE Standard for Information technology-Telecommunications and information exchange between systems Local and metropolitan area networks—Specific requirements—Part 11: Wireless LAN Medium Access Control (MAC) and Physical Layer (PHY) Specifications", Dec. 14, 2016 (Dec. 14, 2016), Piscataway, NJ, USA.

*Primary Examiner* — Yee F Lam

(57) ABSTRACT

This application provides a data transmission method, apparatus and system, so as to copy data in a system memory to a sending queue of a first communications module through a system bus, and then send the data to a second terminal based on the first communications module. Device to device communication, directly through system memory copying and MAC/PHY layer 2 forwarding, greatly optimizes load and delay of Wi-Fi packet forwarding, which can effectively reduce time spent on data transmission of device to device services, effectively reduce system load, reduce transmission delay, and increase the Wi-Fi throughput.

12 Claims, 11 Drawing Sheets

(56) References Cited

U.S. PATENT DOCUMENTS

| | | | |
|---|---|---|---|
| 2002/0156927 A1 | 10/2002 | Boucher et al. | |
| 2008/0165968 A1* | 7/2008 | Yadav | H04L 63/0428 |
| | | | 380/270 |
| 2009/0300328 A1* | 12/2009 | Raju | H04W 28/065 |
| | | | 712/E9.016 |
| 2013/0324186 A1 | 12/2013 | Wasily | |
| 2014/0226462 A1* | 8/2014 | Smith | H04W 16/28 |
| | | | 370/221 |
| 2014/0254424 A1* | 9/2014 | Gao | H04L 1/1614 |
| | | | 370/254 |
| 2014/0269360 A1* | 9/2014 | Jafarian | H04W 52/0209 |
| | | | 370/252 |
| 2014/0341100 A1* | 11/2014 | Sun | H04L 1/08 |
| | | | 370/311 |
| 2015/0055516 A1* | 2/2015 | Smadi | H04W 72/1215 |
| | | | 370/280 |
| 2015/0139203 A1 | 5/2015 | Miryala et al. | |
| 2019/0150214 A1* | 5/2019 | Zhou | H04W 76/15 |
| | | | 370/329 |
| 2020/0029376 A1 | 1/2020 | Asterjadhi et al. | |
| 2020/0280918 A1* | 9/2020 | Huang | H04W 80/02 |

FOREIGN PATENT DOCUMENTS

| | | |
|---|---|---|
| CN | 108092745 A | 5/2018 |
| CN | 109388597 A | 2/2019 |
| CN | 110147251 A | 8/2019 |
| CN | 110505160 A | 11/2019 |
| WO | 2005017662 A2 | 2/2005 |
| WO | 2017166139 A1 | 10/2017 |
| WO | 2018081928 A1 | 5/2018 |

\* cited by examiner

DATA TRANSMISSION METHOD, APPARATUS, AND SYSTEM

This application is a National Stage of International Application No. PCT/CN2020/125586, filed Oct. 30, 2020, which claims priority to Chinese Patent Application No. 202010115820.0. filed Feb. 24, 2020, both of which are hereby incorporated by reference in their entireties.

TECHNICAL FIELD

This application relates to the communications field, and in particular, to a data transmission method, apparatus and system.

BACKGROUND

Device to device (Device to Device, D2D) communications technology refers to a communication mode in which two peer-to-peer user nodes (devices) communicate directly with each other. Wi-Fi Direct is a communication mode that enables device to device services, and allows for high-speed data communication between two devices. Based on TCP/IP protocols for data transmission, Wi-Fi Direct has advantages such as a high data transmission speed and a long transmission distance. FIG. 1 is a schematic diagram of an existing data transmission process based on a TCP/IP protocol. As shown in FIG. 1, when a sender sends a packet, application software encapsulates the to-be-sent packet based on the TCP/IP protocol, and the encapsulated packet can be forwarded in a local area network (LAN) or a wide area network (WAN). After receiving the data, a receiver decapsulates the packet based on the TCP/IP protocol to restore the data required by a user. However, packets need to be encapsulated and decapsulated for Wi-Fi packet forwarding based on TCP/IP protocols in the device to device services, which will undoubtedly increase time spent on data transmission of the device to device services, increase system load, and reduce a Wi-Fi throughput.

SUMMARY

This application provides a data transmission method, apparatus and system, which addresses the problems of long data transmission time of device to device services, heavy system load and low Wi-Fi throughput in the prior art.

To achieve the objective, the following technical solutions are used in this application:

According to a first aspect, a data transmission method is provided, applied to a first terminal and including:

copying an application data frame stored in a system memory to a sending queue of a first communications module through a data bus; and sending the application data frame in the sending queue to a second terminal in device to device communication with the first terminal through a communications port of the first communications module.

The application data frame is used to instruct the second terminal to use a data processing method corresponding to the application data frame for data processing, and the data processing method corresponding to the application data frame is to copy the application data frame to a system memory of the second terminal through a data bus of the second terminal for processing.

In this embodiment, data in a system memory is copied to a sending queue of a first communications module through a system bus, and then the data is sent to a second terminal by using the first communications module. Device to device communication, directly through system memory copying and MAC/PHY layer 2 forwarding, greatly optimizes load and delay of Wi-Fi packet forwarding, which can effectively reduce time spent on data transmission of device to device services, effectively reduce system load, reduce transmission delay, and increase the Wi-Fi throughput.

In a possible implementation of the first aspect, before the copying an application data frame stored in a system memory to a sending queue of a first communications module through a data bus, the method further includes:

fragmenting the application data frame if a data size of the application data frame exceeds a fragmentation threshold, and storing data fragments in a corresponding system memory space;

correspondingly, the copying an application data frame stored in a system memory to a sending queue of a first communications module through a data bus includes:

copying fragmented data from the system memory space storing the data fragments to the sending queue of the first communications module separately; and correspondingly, the sending the application data frame in the sending queue to a second terminal in wireless communication with the first terminal through a communications port of the first communications module includes:

sending the data fragments to the second terminal successively through the communications port of the first communications module based on the sending queue.

In this embodiment, data fragmentation is performed on application data frames whose data sizes exceed the fragmentation threshold, and data transmission is performed on data fragments, so that application data longer than the maximum data transmission length of the network can be transmitted.

In a possible implementation of the first aspect, the data transmission method further includes:

if a retransmission request frame is received from the second terminal, determining to-be-retransmitted data based on the retransmission request frame, and sending the to-be-retransmitted data to the second terminal through the communications port of the first communications module, where the retransmission request frame is generated by the second terminal when it is determined that fragmented data is missing or reassembled data does not meet a preset condition. A data fragment that is missing or does not meet the preset condition can be re-sent in time by sending the to-be-retransmitted data based on the retransmission request frame, thereby ensuring the integrity and accuracy of data.

In a possible implementation of the first aspect, the data transmission method further includes:

determining that data transmission is successful if a data acknowledgment frame is received from the second terminal, where the data acknowledgment frame is generated by the second terminal after reassembling data based on the received data and determining that the data is complete and meets the preset condition. Based on the acknowledgment frame, whether data transmission is successful can be quickly determined, and the reliability of data transmission can be improved.

In a possible implementation of the first aspect, the fragmenting the application data frame if a data size of the application data frame exceeds a fragmentation threshold, and allocating system memory space for each data fragment includes: if the data size of the application data frame exceeds the fragmentation threshold, fragmenting the application data frame into several data fragments based on the maximum data transmission length of a network, and adding a data header to each data fragment, where the data header is used to instruct the second terminal to perform data reassembly on each data fragment after receiving the data fragment to restore the application data frame. A data header is added to data on each fragment to facilitate data reassembly.

According to a second aspect, a data transmission method is provided, applied to a second terminal and including:

receiving an application data frame, where the application data frame is copied by a first terminal in device to device communication with the second terminal from a system memory of the first terminal to a sending queue of a first communications module of the first terminal through a data bus of the first terminal, and the application data frame in the sending queue is sent to the second terminal through a communications port of the first communications module; and copying the application data frame to a system memory of the second terminal through a data bus of the second terminal.

In this embodiment, the received data is copied directly to the system memory through the system bus, so that application software can directly process the data stored in the system memory, thereby effectively reducing time spent on data transmission of device to device services, effectively reducing system load, reducing transmission delay, and increasing the Wi-Fi throughput.

In a possible implementation of the second aspect, the received application data frame includes several data fragments;

correspondingly, after copying the application frame to the system memory through the data bus, where the system memory is system memory space in which application software can directly process data stored therein, the method further includes: performing data reassembly on the data fragments. Data reassembly is performed on fragmented data to restore data that can be processed directly by the application software to facilitate the processing of the data by the application software.

In a possible implementation of the second aspect, the data transmission method further includes: if a data fragment is missing or reassembled data does not meet a preset condition, generating a retransmission request frame based on to-be-retransmitted data, and returning the retransmission request frame to the first terminal, where the retransmission request frame is used to instruct the first terminal to resend the to-be-retransmitted data. A data fragment that is missing or does not meet the preset condition can be obtained in time by sending the to-be-retransmitted data based on the retransmission request frame, thereby ensuring the integrity and accuracy of data.

In a possible implementation of the second aspect, the data transmission method further includes: returning an acknowledgment frame to the first terminal if the reassembled data is complete and as expected. Based on the acknowledgment frame, the first terminal can confirm that data transmission is successful at the first time, so as to improve the reliability of data transmission.

According to a third aspect, a data transmission apparatus is provided, applied to a first terminal and including:

a first system memory copying unit, configured to copy an application data frame stored in a system memory to a sending queue of a first communications module through a data bus; and a sending unit, configured to send the application data frame in the sending queue to a second terminal in device to device communication with the first terminal through a communications port of the first communications module.

In a possible implementation of the third aspect, the apparatus further includes a fragmentation unit.

The fragmentation unit is configured to fragment the application data frame if a data size of the application data frame exceeds a fragmentation threshold, and store data fragments in a corresponding system memory space;

correspondingly, the first system memory copying unit is configured to copy fragmented data from the system memory space storing the data fragments to the sending queue of the first communications module separately; and correspondingly, the sending unit is configured to send the data fragments to the second terminal successively through the communications port of the first communications module based on the sending queue.

In a possible implementation of the third aspect, the apparatus further includes a retransmission unit.

The retransmission unit is configured to: if a retransmission request frame is received from the second terminal, determine to-be-retransmitted data based on the retransmission request frame, and send the to-be-retransmitted data to the second terminal through the communications port of the first communications module, where the retransmission request frame is generated by the second terminal when it is determined that fragmented data is missing or reassembled data does not meet a preset condition.

In a possible implementation of the third aspect, the apparatus further includes a determining unit.

The determining unit is configured to determine that data transmission is successful if a data acknowledgment frame is received from the second terminal, where the data acknowledgment frame is generated by the second terminal after reassembling data based on the received data and determining that the data is complete and meets the preset condition.

In a possible implementation of the third aspect, the fragmentation unit is specifically configured to: if the data size of the application data frame exceeds the fragmentation threshold, fragment the application data frame into several data fragments based on the maximum data transmission length of a network, and add a data header to each data fragment, where the data header is used to instruct the second terminal to perform data reassembly on each data fragment after receiving the data fragment to restore the application data frame.

According to a fourth aspect, a data transmission apparatus is provided, applied to a second terminal and including:

a receiving unit, configured to receive an application data frame, where the application data frame is copied by a first terminal in device to device communication with the second terminal from a system memory of the first terminal to a sending queue of a first communications module of the first terminal through a data bus of the first terminal, and the application data frame in the sending queue is sent to the second terminal through a communications port of the first communications module; and a second system memory copying unit, configured to copy the application data frame to a system memory of the second terminal through a data bus of the second terminal.

In a possible implementation of the fourth aspect, the received application data frame includes several data fragments; and correspondingly, the apparatus further includes a reassembly unit.

The reassembly unit is configured to perform data reassembly on the data fragments.

In a possible implementation of the fourth aspect, the apparatus further includes a retransmission acknowledgment unit.

The retransmission acknowledgment unit is configured to: if a data fragment is missing or reassembled data does not meet a preset condition, generate a retransmission request frame based on to-be-retransmitted data, and return the retransmission request frame to the first terminal, where the retransmission request frame is used to instruct the first terminal to resend the to-be-retransmitted data.

In a possible implementation of the fourth aspect, the apparatus further includes an acknowledgment returning unit.

The acknowledgment returning unit is configured to return an acknowledgment frame to the first terminal if the reassembled data is complete and as expected.

According to a fifth aspect, an embodiment of this application provides a terminal device, including: a memory and a processor, where the memory is configured to store a computer program, and the processor is configured to perform the method according to the first aspect or the second aspect when the computer program is invoked.

According to a sixth aspect, an embodiment of this application provides a data transmission system, including a first terminal and a second terminal, where the first terminal is configured to perform the method according to the first aspect, and the second terminal is configured to perform the method according to the second aspect.

According to a seventh aspect, an embodiment of this application provides a computer readable storage medium, where the computer readable storage medium stores a computer program, and the computer program, when executed by a processor, implements the method according to the first aspect or the second aspect.

According to an eighth aspect, an embodiment of this application provides a computer program product, where when the computer program product runs on an electronic device, a terminal device is enabled to perform the method according to the first aspect or the second aspect.

It may be understood that, for beneficial effects brought by the third aspect to the eighth aspect, refer to related description in the first aspect or the second aspect. Details are not described herein again.

DESCRIPTION OF EMBODIMENTS

Figure 1:
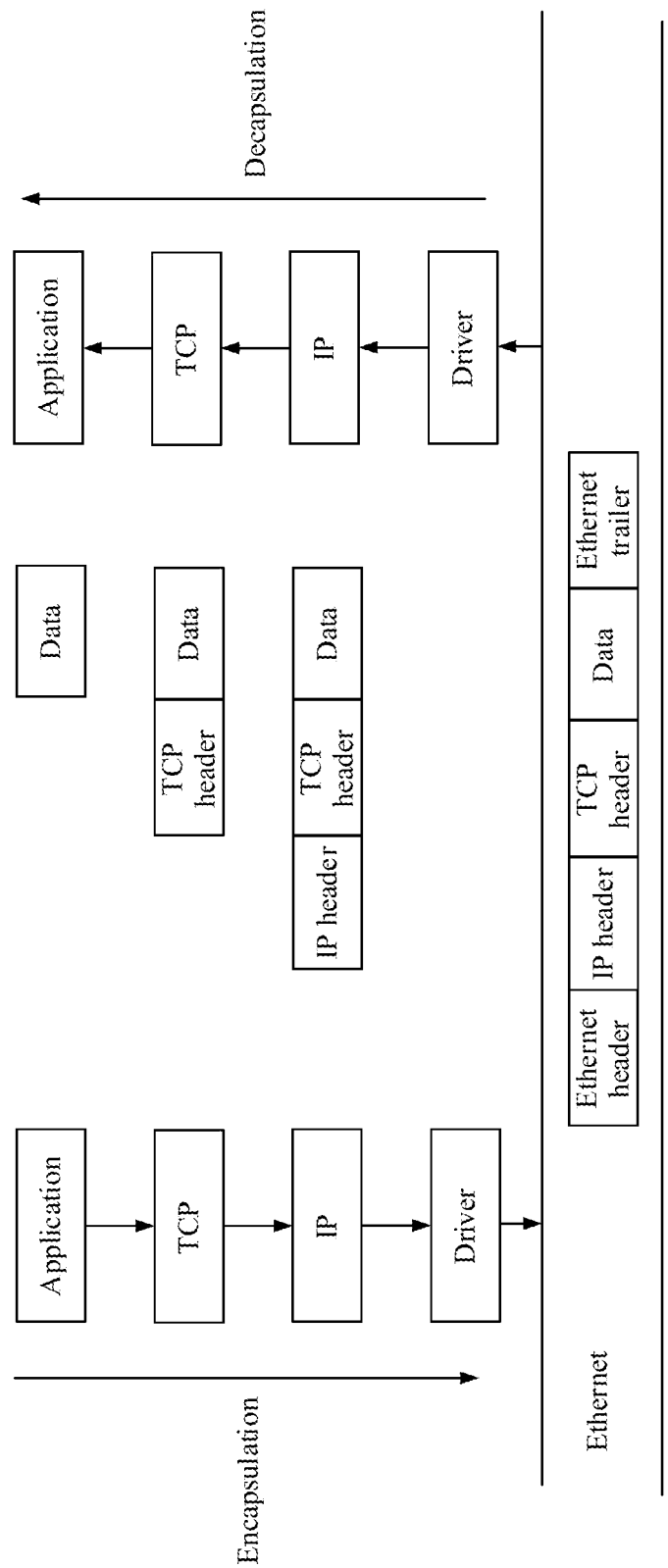
FIG. 1 is a schematic diagram of an existing data transmission process based on a TCP/IP protocol.

In the following description, for the purpose of explanation rather than limitation, specific details such as a specific system architecture and a technology are set forth to provide a thorough understanding of the embodiments of this application. However, it will be obvious to a person skilled in the art that this application may be practiced in other embodiments without these specific details. In other cases, detailed descriptions of well-known systems, apparatuses, circuits, and methods are omitted, so that the present invention is described without being obscured by unnecessary details.

It should be understood that the term "include", when used in the specification and the appended claims of this application, specifies the presence of stated features, integers, steps, operations, elements and/or components, but does not preclude the presence or addition of one or more other features, integers, steps, operations, elements, components, and/or groups thereof.

It should also be understood that the term "and/or" as used herein refers to and includes any and all possible combinations of one or more of the associated listed items.

As used herein, the term "if" may be construed to mean "when" or "upon" or "in response to determining" or "in response to detecting", depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]".

In addition, as used herein, the terms such as "first", "second", and "third" are used only for the purpose of description, and should not be understood as indicating or implying relative importance.

Referring to "one embodiment" or "some embodiments" or the like described in the specification of this application means that one or more embodiments of this application include a specific feature, structure, or characteristic described with reference to the embodiment. Therefore, the statements "in one embodiment", "in some embodiments", "in some other embodiments", and the like appearing at different locations in the specification do not mean that these embodiments are all necessarily referred to, but mean "one or more but not all embodiments", unless otherwise specifically emphasized in other ways. The terms "include", "comprise", "have", and their variants all mean "including but not limited to", unless otherwise specifically emphasized in other ways.

To resolve existing problems of long data transmission time of device to device services, heavy system load and low Wi-Fi throughput, embodiments of this application provide a login authentication method and system, and a terminal device. The method includes copying data in a system memory to a sending queue of a first communications module through a system bus, and then sending the data to a second terminal by using the first communications module. The device to device communication is directly implemented through system memory copying and MAC/PHY layer 2 forwarding without using a conventional TCP/UDP transport layer protocol or an IP network layer protocol. This greatly optimizes load and delay of Wi-Fi packet forwarding, and can effectively reduce time spent on data transmission of device to device services, effectively reduce system load, reduce transmission delay, and increase the Wi-Fi throughput.

The technical solutions of this application will be described in detail with reference to specific embodiments below. The following specific embodiments may be combined with each other, and details of the same or similar concepts or processes may not be repeated in some embodiments.

Figure 2:
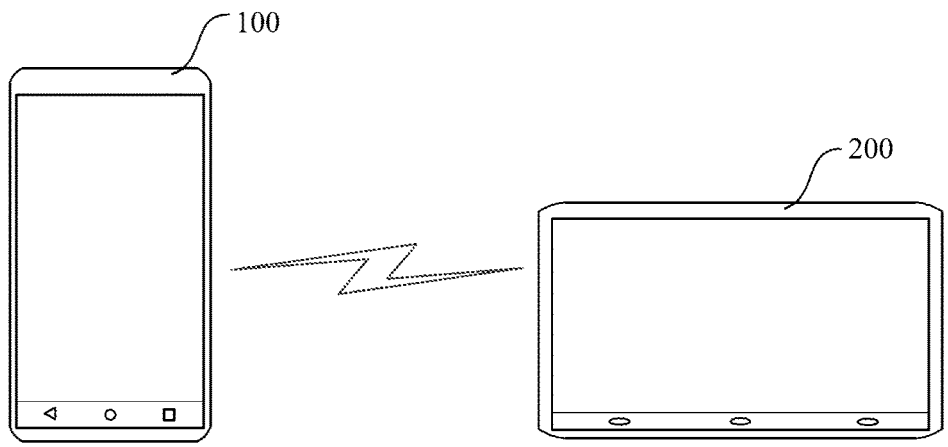
FIG. 2 is a schematic structural diagram of a data transmission system according to an embodiment of this application.

FIG. 2 is a schematic structural diagram of a data transmission system according to an embodiment of this application. As shown in FIG. 2, the data transmission system according to this embodiment may include: a first terminal 100 and a second terminal 200. The first terminal 100 and the second terminal 200 can share data directly by establishing a device to device (Device to Device, D2D) communication connection, for example, in service scenarios such as performing screen projection, sharing files, and cloning applications. These service scenarios are characterized in that Wi-Fi packets do not need to be forwarded in a local area network (LAN) or a wide area network (WAN). Usually, a device to device communication connection between two devices is established in a Wi-Fi P2P mode, or one terminal device works in an AP mode and the other terminal works in a STA mode, and the STA is associated with the AP to establish a Wi-Fi link between the two terminals.

In this embodiment, the first terminal device 100 may be a non-portable device such as a vehicle-mounted terminal, a TV set (smart TV set), a projector, a smart speaker, or a desktop computer, or may be a portable device such as a mobile phone, a tablet computer, or a notebook computer. The second terminal 200 may alternatively be a non-portable device such as a vehicle-mounted terminal, a smart TV set, a smart speaker, or a desktop computer, or may be a portable device such as a mobile phone, a tablet computer, a notebook computer, or a smart wearable device. The quantity of both the first terminal 100 and the second terminal 200 is at least one, and the specific quantity is not particularly limited in this embodiment.

It should be noted that in this embodiment, there is no strict distinction between the first terminal 100 and the second terminal 200, and the same terminal device may be used as the first terminal 100 in some scenarios and as the second terminal 200 in some other scenarios. For example, in a scenario, data may be transmitted to a TV set by using a mobile phone; and in another scenario, data may alternatively be transmitted to a mobile phone by using a tablet computer.

In addition, during data transmission, data may be transmitted to the second terminal 200 by using the first terminal 100, or data may be transmitted to the first terminal 100 by using the second terminal 200. For example, in a scenario, shared data may be transmitted to a tablet computer by using a mobile phone; and in another scenario, shared data may alternatively be transmitted to the mobile phone by using a tablet computer. In this embodiment of this application, a data transmission process of transmitting shared data to the second terminal 200 by using the first terminal 100 is illustrated as an example.

Figure 3:
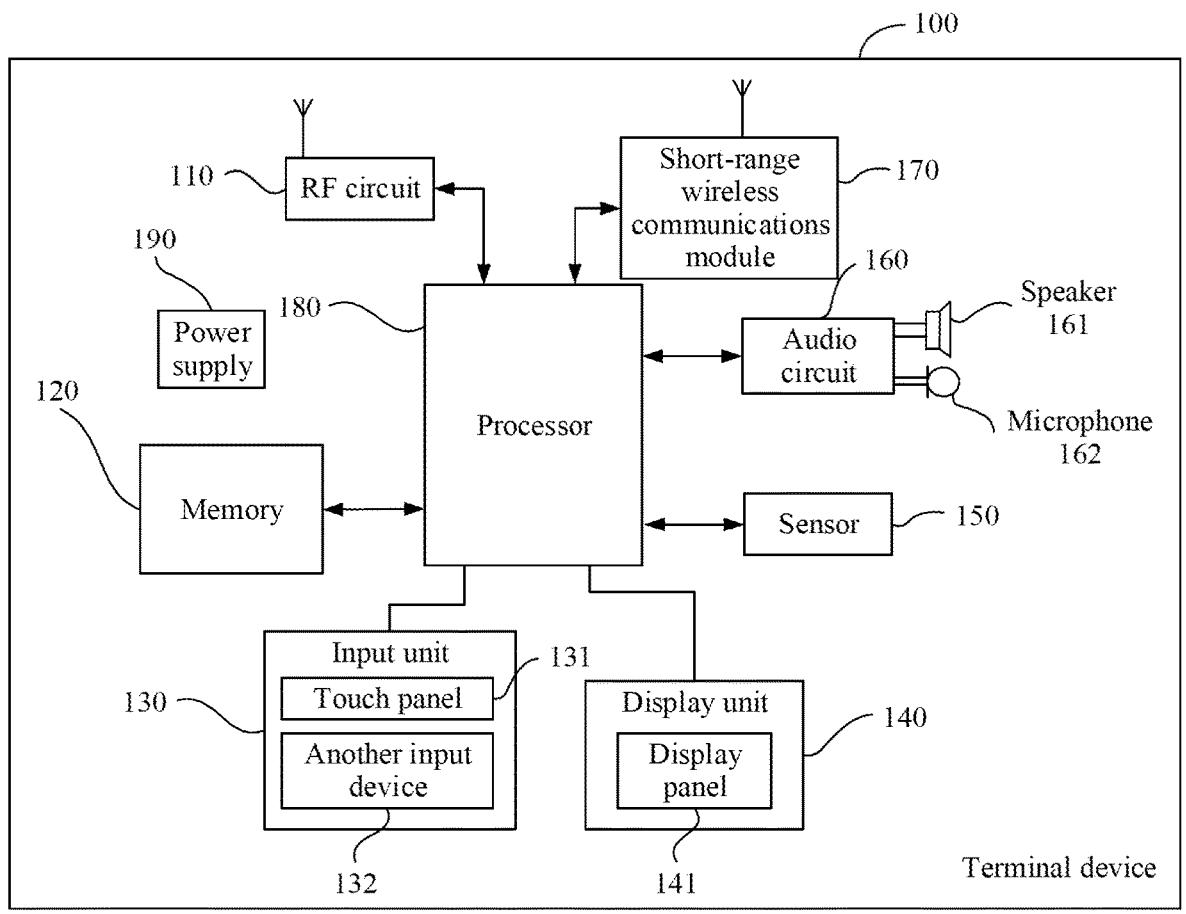
FIG. 3 is a schematic diagram of a hardware structure of a mobile phone to which a data transmission method according to an embodiment of this application is applicable.

In this embodiment, the first terminal 100 may be a mobile phone 100 having the hardware structure shown in FIG. 3. As shown in FIG. 3, the mobile phone 100 may specifically include components such as a radio frequency (Radio Frequency, RF) circuit 110, a memory 120, an input unit 130, a display unit 140, a sensor 150, an audio circuit 160, a short-range wireless communications module 170, a processor 180, and a power supply 190. It may be understood by a person skilled in the art that the structure of the mobile phone 100 shown in FIG. 3 does not constitute a limitation on the terminal device. The terminal device may include more or fewer components than those shown in the figure, or combine some components, or have a different component arrangement.

Components of the mobile phone will be described in detail below with reference to FIG. 3:

The RF circuit 110 may be configured to receive and send signals during information sending or receiving or a call, and in particular, to receive downlink information from a base station and then send the information to the processor 180 for processing, and send designed uplink data to the base station. Usually, the RF circuit includes, but is not limited to, an antenna, at least one amplifier, a transceiver, a coupler, a low noise amplifier (Low Noise Amplifier, LNA), and a duplexer. In addition, the RF circuit 110 may alternatively communicate with a network and another device through wireless communication. The wireless communication may use any communication standard or protocol, including but not limited to global system of mobile communication (Global System of Mobile communication, GSM), general packet radio service (General Packet Radio Service, GPRS), code division multiple access (Code Division Multiple Access, CDMA), wideband code division multiple access (Wideband Code Division Multiple Access, WCDMA), long term evolution (Long Term Evolution, LTE), e-mail, and short messaging service (Short Messaging Service, SMS).

The memory 120 may be configured to store a software program and a module, and the processor 180 executes various function applications and data processing of the mobile phone by running the software program and the module stored in the memory 120. The memory 120 may primarily include a program storage area and a data storage area. The program storage area may store an operating system, an application required by at least one function (for example, a sound playback function and an image playback function), and the like. The data storage area may store data (for example, audio data and a phone book) created based on use of the mobile phone, and the like. In addition, the memory 120 may include a high-speed random access memory, and may further include a non-volatile memory, such as at least one magnetic disk storage device, a flash memory device, or another volatile solid-state storage device.

The input unit 130 may be configured to receive entered digit or character information, and generate a key signal input related to user settings and function control of the mobile phone 100. Specifically, the input unit 130 may include a touch panel 131 and another input device 132. The touch panel 131, also referred to as a touch screen, may collect a user's touch operations on or near the touch panel 131 (for example, the user's operations on or near the touch panel 131 using any suitable object or accessory such as a finger or a stylus), and drive a corresponding connected device based on a predetermined program. Optionally, the touch panel 131 may include two parts: a touch detector and a touch controller. The touch detector detects a touch position of the user, detects a signal from a touch operation, and transmits the signal to the touch controller. The touch controller receives touch information from the touch detector, converts the touch information into contact coordinates, then sends the contact coordinates to the processor 180, and can receive and execute commands sent from the processor 180. In addition, the touch panel 131 may be implemented into several types: resistive type, capacitive type, infrared type, and surface acoustic wave type. In addition to the touch panel 131, the input unit 130 may alternatively include another input device 132. Specifically, the another input device 132 may include, but is not limited to, one or more of a physical keyboard, a function key (for example, volume control key or power on/off key), a trackball, a mouse, a joystick, and the like.

The display unit 140 may be configured to display information entered by the user or provided to the user and all menus of the mobile phone. The display unit 140 may include a display panel 141. Optionally, the display panel 141 may be configured in the form of a liquid crystal display (Liquid Crystal Display, LCD) or an organic light-emitting diode (Organic Light-Emitting Diode, OLED). Further, the touch panel 131 may cover the display panel 141, and the touch panel 131, upon detection of a touch operation on or near the touch panel, transmits the touch operation to the processor 180 to determine the type of a touch event, and then the processor 180 provides a corresponding visual output on the display panel 141 based on the type of the touch event. Though in FIG. 3, the touch panel 131 and the display panel 141 implement input and output functions of the mobile phone as two separate components, in some embodiments, the touch panel 131 may be integrated with the display panel 141 to implement the input and output functions of the mobile phone.

The mobile phone 100 may alternatively include at least one sensor 150, such as a light sensor, a motion sensor, and another sensor. Specifically, the light sensor may include an ambient light sensor and a proximity sensor, where the ambient light sensor may adjust the brightness of the display panel 141 based on the brightness of ambient light, and the proximity sensor may turn off the display panel 141 and/or backlight when the mobile phone is moved to the ear. As a type of motion sensor, an accelerometer sensor may detect the magnitude of acceleration in all directions (usually three axes), may detect the magnitude and direction of gravity when it is stationary, and may be used to identify applications of mobile phone attitude (for example, switch between landscape and portrait, related games, and magnetometer attitude calibration), vibration recognition-related functions (for example, pedometer and tap). As for another sensor such as gyroscope, barometer, hygrometer, thermometer and infrared sensor that may be configured for the mobile phone, details are not described herein again.

An audio circuit 160, a speaker 161, and a microphone 162 may be separately provided with an audio interface between the user and the mobile phone. The audio circuit 160 may transmit an electrical signal converted from received audio data to the speaker 161, and the speaker 161 converts the electrical signal into an acoustical signal for output. In addition, the microphone 162 converts the collected acoustical signal into an electrical signal, the electrical signal is received by the audio circuit 160 and then converted into audio data, then the audio data is output to the processor 180 for processing, and the processed audio data is sent to, for example, another mobile phone through the RF circuit 110, or the audio data is output to the memory 120 for further processing.

Wi-Fi is a short-range wireless transmission technology. A mobile phone may help a user send and receive e-mails, browse web pages and access streaming media through a Wi-Fi module 170. Wi-Fi provides the user with wireless broadband Internet access. The Wi-Fi module 170 may include a Wi-Fi chip through which a function of Wi-Fi Direct connection between the mobile phone 100 and another terminal device can be implemented. The mobile phone 100 may alternatively work in an AP mode (Access Point mode) that may provide wireless access services and allow another wireless device to access, or work in a STA mode (Station mode) in which the AP can be connected and access from wireless devices is not accepted, so as to establish device to device communication between the mobile phone 100 and another Wi-Fi device.

As a control center of the mobile phone, the processor 180 is connected to parts of the mobile phone by various interfaces and lines to perform functions and process data of the mobile phone by running or executing the software program and/or the module stored in the memory 120, and invoking data stored in the memory 120, so as to monitor the mobile phone as a whole. Optionally, the processor 180 may include one or more processing units; and preferably, the processor 180 may be integrated into an application processor and a modem processor. The application processor is mainly configured to process an operating systems, a user interface, and an application. The modem processor is mainly configured to process wireless communication. It may be understood that the modem processor may alternatively not be integrated into the processor 180.

The mobile phone 100 also includes a power supply 190 (for example, a battery) for supplying power to all components. Preferably, the power supply may be logically connected to the processor 180 by using a power management system, so that functions such as charging and discharging management and power consumption management may be implemented by using the power management system.

A software system of the mobile phone 100 may use a layered architecture, an event-driven architecture, a microkernel architecture, a microservice architecture, or a cloud architecture. In the embodiment of the present invention, an Android system with a layered architecture is used as an example to illustrate a software architecture of the mobile phone 100.

Figure 4:
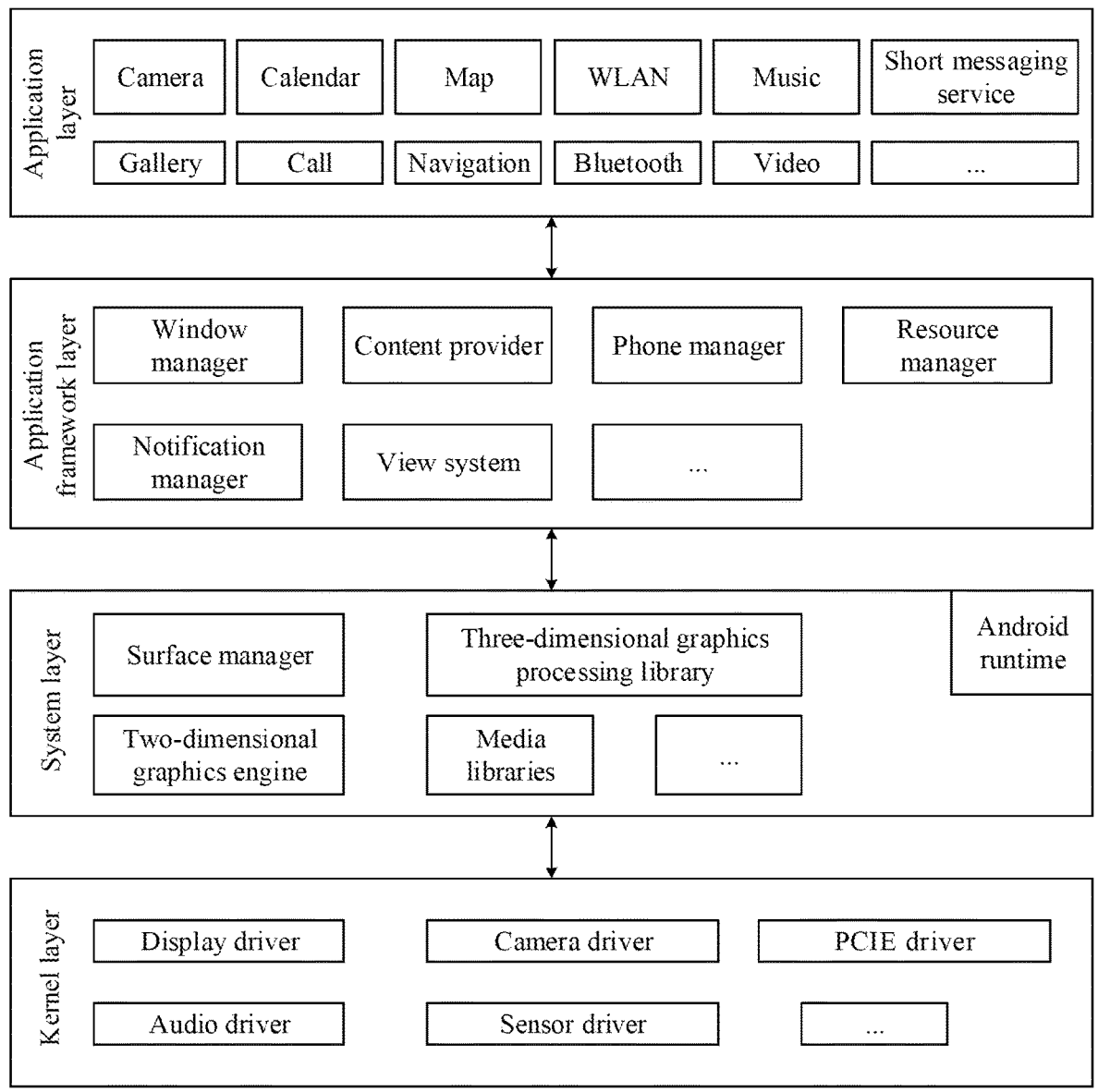
FIG. 4 is a schematic diagram of a software architecture of a mobile phone to which a data transmission method according to an embodiment of this application is applicable.

FIG. 4 is a block diagram of a software architecture of a mobile phone 100 according to an embodiment of this application. The Android system is divided into four layers: an application layer, an application framework layer (framework, FWK), a system layer, and a hardware abstraction layer. The layers communicate with each other through software interfaces.

The layered architecture divides software into several layers, and each layer has a clear role and division of labor. The layers communicate with each other through software interfaces. In some embodiments, the Android system is divided into four layers: an application layer, an application framework layer, Android runtime (Android runtime) and system libraries, and a kernel layer from the top down.

The application layer may include a series of application packages.

As shown in FIG. 4, the application packages may include applications such as camera, gallery, calendar, call, map, navigation, WLAN, Bluetooth, music, video, and short messaging service.

The application framework layer provides an application programming interface (application programming interface, API) and a programming framework for applications at the application layer. The application framework layer includes some predefined functions.

As shown in FIG. 4, the application framework layer may include a window manager, a content provider, a view system, a phone manager, a resource manager, and a notification manager.

The window manager is configured to manage window programs. The window manager can obtain the size of the display screen, determine whether there is a status bar, lock the screen, take a screenshot, and the like.

The content provider is configured to store and obtain data, and enables these data to be accessible to an application. The data may include videos, images, audio, calls made and received, browsing history and bookmarks, phone books, and the like.

The view system includes visual controls, such as a control for displaying text and a control for displaying pictures. The view system may be configured to build an application. A display interface may include one or more views. For example, a display interface that includes a short messaging service notification icon may include a view for displaying text and a view for displaying pictures.

The phone manager is configured to provide communication functions of an electronic device 100, such as call state management (including connecting, hanging up, or the like).

The resource manager provides resources for applications, such as localized strings, icons, images, layout files, and video files.

The notification manager enables an application to display notification information in the status bar, which can be used to convey a notification-type message, and can automatically disappear after a short stay without user interaction. For example, the notification manager is used for notifying download completion or as a message reminder. The notification manager may alternatively be a notification that appears in the status bar at the top of the system in the form of a chart or scroll bar text, such as a notification for an application running in the background, or a notification that appear on the screen in the form of a dialog window. For example, a text message is displayed in the status bar, a prompt tone is made, an electronic device is vibrating and, an indicator light is flashing.

The Android runtime includes a core library and a virtual machine. The Android runtime is responsible for scheduling and management of the Android system.

The core library includes two parts: one part is function functions that the java language needs to invoke, and the other part is the core library of Android.

The application layer and the application framework layer run in a virtual machine. The virtual machine executes java files at the application layer and the application framework layer as binary files. The virtual machine is configured to implement functions such as object lifecycle management, stack management, thread management, security and exception management, and recycling of waste.

A system library may include a plurality of functional modules, such as a surface manager (surface manager), media libraries (Media Libraries), three-dimensional graphics processing library (for example, OpenGL ES), and a 2D graphics engine (for example, SGL).

The surface manager is configured to manage a display subsystem, and provide fusion of 2D and 3D layers for multiple applications.

The media libraries support multiple common audio and video formats for playback and recording, as well as static image files. The media libraries may support a variety of audio and video encoding formats, such as MPEG4, H.264, MP3, AAC, AMR, JPG, and PNG.

The three-dimensional graphics processing library is configured to achieve three-dimensional graphics drawing, image rendering, compositing, and layer processing.

The 2D graphics engine is a graphics engine for 2D graphics.

The kernel layer is a layer between hardware and software. The kernel layer includes at least a display driver, a camera driver, an audio driver, and a sensor driver. In some embodiments, the kernel layer also includes a PCIE driver.

It should be noted that the second terminal 200 may alternatively be a mobile phone having the hardware structure shown in FIG. 3 and the software architecture shown in FIG. 4. Details are not described herein again.

In this embodiment, the first terminal 100 (transmit end) may start a data transmission process by using application software, and copy to-be-sent application data to a sending sequence of a Wi-Fi chip through a system bus (for example, peripheral component interconnect express (Peripheral Component Interconnect Express, PCIE) or SDIO bus) based on direct memory access (Direct Memory Access, DMA), and then the Wi-Fi chip sends an application data frame to the second terminal 200 (receive end) through a communications port (for example, an air interface) by using a 802.11 MAC/PHY layer control protocol. After receiving the application data frame, the second terminal 200 directly copies the received data into the system memory through the system bus based on direct memory access, so that application software of the second terminal 200 can process the data in the system memory. Such a minimal Wi-Fi transmission path can effectively reduce time spent on data transmission of device to device services, effectively reduce system load, reduce transmission delay, and increase the Wi-Fi throughput.

In addition, after sending data, the first terminal 100 may alternatively monitor whether an acknowledgment frame or a retransmission request frame returned by the second terminal 200 is received within a preset period. If the acknowledgment frame returned by the second terminal 200 is received, it may be determined that the data transmission is successful. If the retransmission request frame returned by the second terminal 200 is received, to-be-retransmitted data may be determined based on the retransmission request frame, and then the to-be-retransmitted data may be re-sent to the second terminal 200 to ensure the integrity and accuracy of the data.

In addition, when it is determined that the received data is complete and meets a preset condition, the second terminal 200 may generate an acknowledgment frame and return the acknowledgment frame to the first terminal 100, so that the first terminal 100 may determine whether the data transmission is successful. After determining that the received data is incomplete or does not meet the preset condition, the second terminal 200 may alternatively return the retransmission request frame to the first terminal 100, so that the first terminal 100 may retransmit the data to the second terminal based on the retransmission request frame. After receiving the acknowledgment frame returned by the second terminal, the first terminal 100 may alternatively return a feedback message to notify the second terminal that the acknowledgment frame has been received.

In addition, if the first terminal 100 receives neither an acknowledgment frame nor a retransmission acknowledgment frame within a preset period, it may be determined that a fault has occurred on the device to device communication network between the first terminal 100 and the second terminal 200, and device to device communication with the second terminal 200 may be instructed to be reestablished. It may be understood that for re-establishment of the device to device communication with the second terminal 200, the first terminal 100 may perform automatic connection; alternatively, a prompt message is returned to the user, and the user may choose whether to reconnect, and when the user chooses to reconnect, the device to device communication with the second terminal 200 is established. Details are not described herein again.

Figure 5:
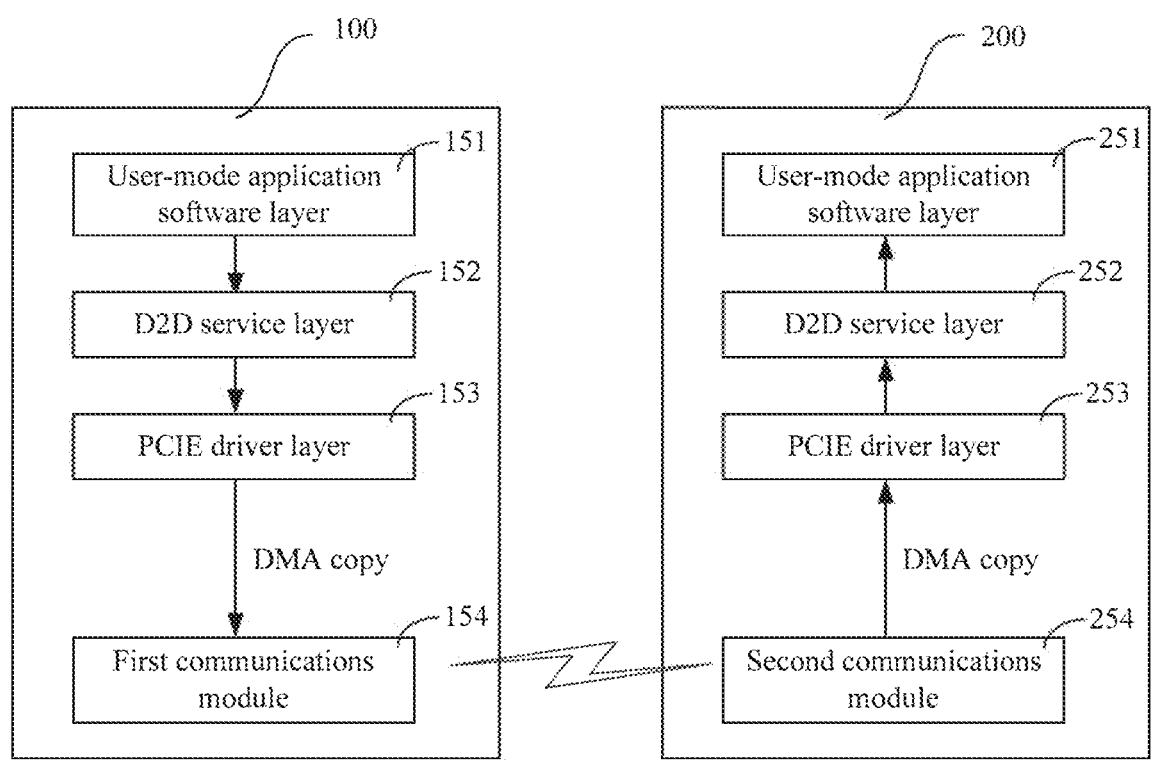
FIG. 5 is a schematic diagram of a scenario for a data transmission method according to an embodiment of this application.

FIG. 5 is a schematic diagram of a scenario for a data transmission method according to an embodiment of this application. As shown in FIG. 5, the first terminal 100 includes a user-mode application software layer 151, a D2D service layer 152, a PCIE driver layer 153 and a first communications module 154; and the second terminal 200 also includes a user-mode application software layer 251, a D2D service layer 252, a PCIE driver layer 253, and a second communications module 254. The first communications module 154 and the second communications module 254 may be Wi-Fi chips, or other communications chips that may implement device to device wireless communication, such as Bluetooth chips. It should be noted that the communications chips may be integrated into the Wi-Fi module 170 shown in FIG. 3 to enable device to device communication between the first terminal 100 and another terminal. This embodiment of this application is illustrated based on an example in which the first communications module 154 and the second communications module 254 are Wi-Fi chips.

Referring to FIG. 5, after user-mode application software of the first terminal 100 determines data to be sent to the second terminal 200, application data in a buffer containing the to-be-sent data (application data frame) may be fragmented at the D2D service layer 152. A data header is added to each data fragment, a fragmentation system memory space is applied for each data fragment, and each data fragment is stored in a corresponding fragmentation system memory space. Then, the data fragments stored in the memory space of the fragmentation system are copied to a sending queue of the first communications module 154 through a PCIE data bus. The first communications module 154 adds corresponding wireless network fields to the data fragments in the sending queue based on the 802.11 MAC/PHY layer control protocol to generate a packet, and then the packet is sent to the second terminal 200 through the communications port of the first communications module 154. After receiving the packet from the first communications module 154, the second communications module 254 of the second terminal 200 can obtain application data contained in the packet. Then the second communications module 254 directly copies the received application data into the system memory through a PCIE data bus, and the D2D service layer 252 may process the data stored in the system memory (for example, perform data reassembly) to restore the received data into a data frame that can be directly processed by the user-mode application software, so that the user-mode application software can process the data frame directly, for example, directly read and display the data in a specified system memory area. If some fragments are found missing during data reassembly, a retransmission request frame may be sent to the first terminal 100 based on the missing fragments to request the first terminal 100 to retransmit missing fragmented data. If an error is found in the reassembled data during data reassembly, a retransmission request frame may alternatively be sent to the first terminal 100 to request the first terminal 100 to retransmit all application data. If the data is complete and as expected after data reassembly, an acknowledgment frame (ACK frame) is returned to the first terminal 100. After receiving the retransmission request frame, the first terminal 100 determines to-be-retransmitted data based on the content of the retransmission request frame, and then sends the to-be-retransmitted data to the second terminal 200 by following the above data transmission process. The first terminal 100 can also, upon receiving the acknowledgment frame from the second terminal 200, return a data transmission success instruction to the user-mode application software to indicate that the data transmission is successful. With data fragmentation, requirements of data transmission can be met, it can be ensured that the data is transmitted to the peer terminal completely. In addition, a simple retransmission acknowledgment mechanism is used to ensure that the data received by the peer terminal is complete and accurate, thereby effectively improving the accuracy of data transmission.

Figure 6:
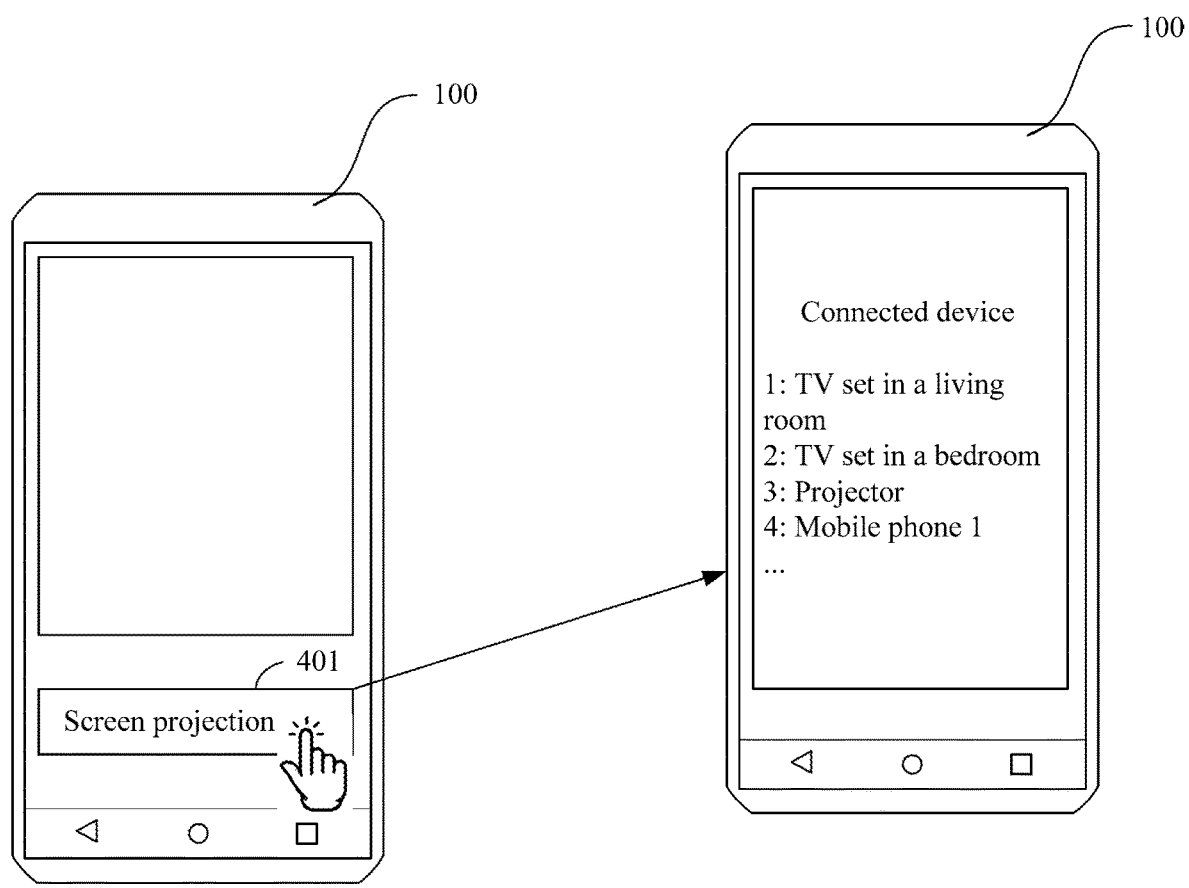
FIG. 6 is a schematic diagram of a display interface of video playback software in a mobile phone and a display interface with a screen projection function triggered.

A data transmission process in which a mobile phone projects video data in the video playback software to a TV set for playback is used as an example. FIG. 6 shows a display interface of video playback software in a mobile phone and a display interface after a screen projection function is triggered. The video playback software in the mobile phone may have a screen projection function. A user touches a screen projection control 401 on the touch screen to trigger the screen projection function. After the user touches or presses the screen projection control, the mobile phone may display a list of connected devices for the user to select a terminal device that needs to transmit data, that is, the user may select a corresponding terminal device from the list, such as a TV set in a living room. In this case, the mobile phone establishes device to device communication with the TV set in the living room. The mobile phone obtains video data by using the video playback software, and the video data frame is copied from the system memory to a sending queue of a Wi-Fi chip (first communications module) of the mobile phone based on direct memory access of the video data through a PCIE bus. Then, the Wi-Fi chip of the mobile phone sends the video data to a Wi-Fi chip (second communications module) of the TV set based on a 802.11 MAC/PHY layer protocol. After receiving the video data, the Wi-Fi chip of the TV set copies the received video to the system memory of the TV set through the PCIE bus based on direct memory access, so that a TV playback application directly reads the video data in a specified system memory area for playback. In a device to device application scenario, the Wi-Fi chip does not need to use a complex TCP/IP protocol stack to transmit data, but only needs to perform device to device communication through system memory copying and MAC/PHY layer 2 forwarding, which can effectively reduce data transmission delay, reduce system load and increase the Wi-Fi throughput.

It should be noted that, for a non-device to device communication service, the Wi-Fi chip may still use a conventional TCP/IP protocol stack for communication. Details are not described herein again.

Figure 7A:
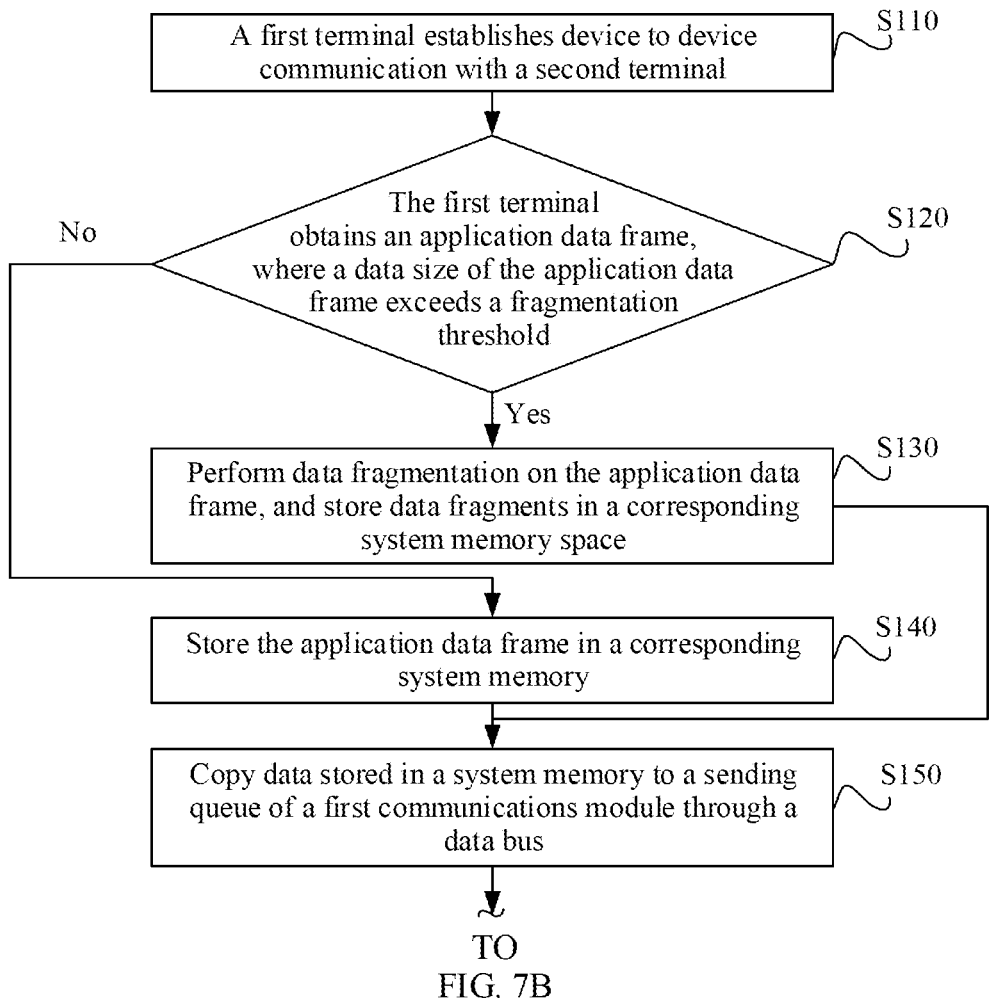
FIG. 7 is a schematic diagram of an implementation process of a data transmission method according to an embodiment of this application.
Figure 7B:
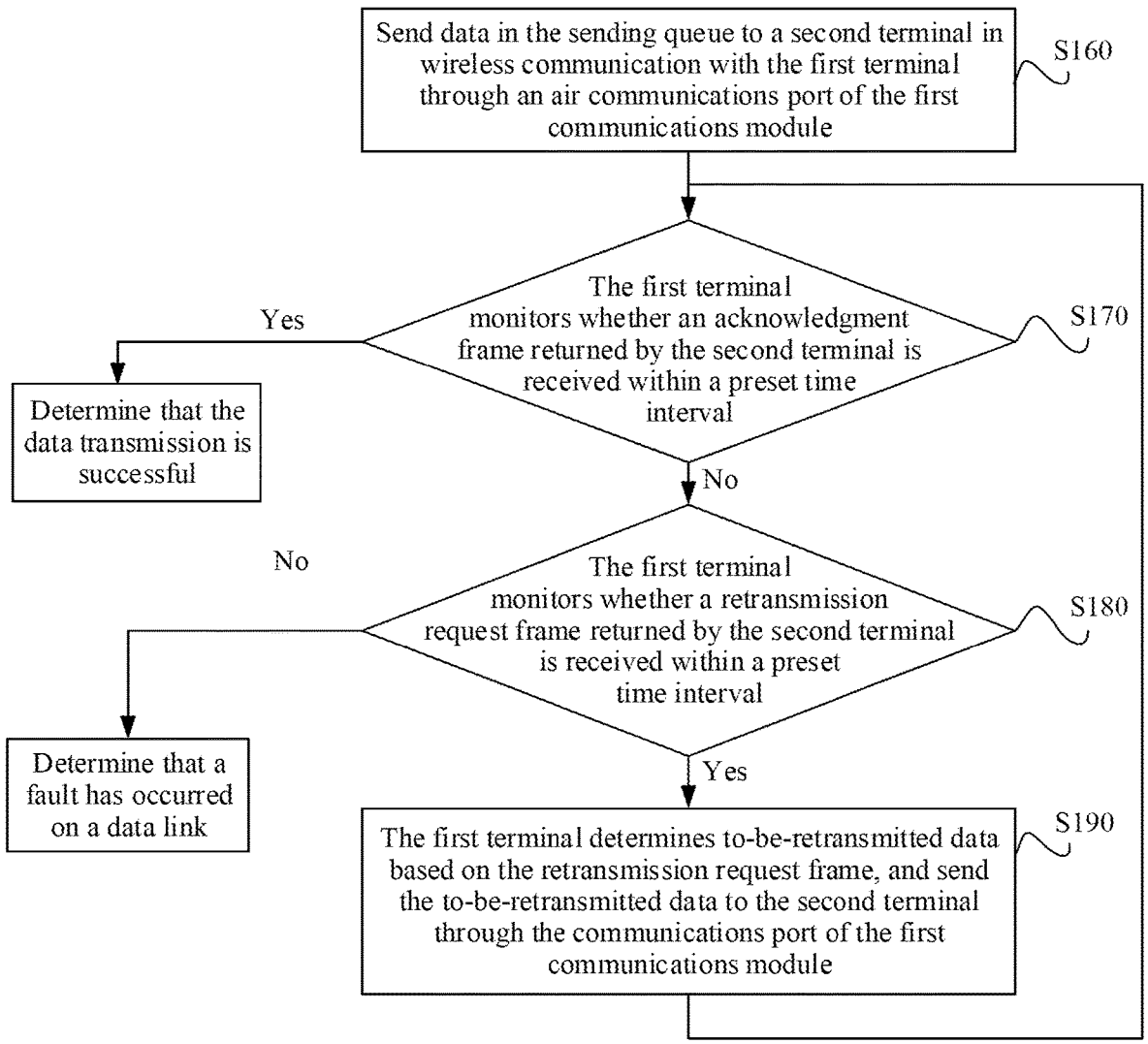

FIG. 7 is a schematic flowchart of a data transmission method according to an embodiment of this application. As shown in FIG. 7, the data transmission method specifically includes the following steps:

S110: A first terminal establishes device to device communication with a second terminal.

As described in the foregoing embodiment, the first terminal may establish a Wi-Fi Direct connection with a Wi-Fi chip of the second terminal by using its Wi-Fi chip, or enable the first terminal to work in an AP mode (Access Point mode) that can provide wireless access services and allow another wireless device to access, and enable the second terminal to work in a STA mode (Station mode) in which the AP can be connected and access from wireless devices is not accepted, so as to establish device to device communication between the first terminal and the second terminal. Here, a user may select an object (data receiving end) that needs to transmit data. As described in the foregoing example, the first terminal may display a list of connected devices for a user to select a terminal device that needs to transmit data, and the user may select a second terminal from the list. In this case, the first terminal initiates a connection request to the second terminal, and if the second terminal responds to the connection request, device to device communication between the first terminal and the second terminal can be established. After a connection is established between the first terminal and the second terminal, data interaction may be performed by the established device to device communication.

S120: The first terminal obtains an application data frame, and determines whether a data size of the application data frame exceeds a fragmentation threshold; if the data size of the application data frame exceeds the fragmentation threshold, S130 is performed; or if the data size of the application data frame does not exceed the fragmentation threshold, S140 is performed.

Specifically, the application data frame to be transmitted to the second terminal may be determined by using the user-mode application software of the first terminal. For example, when an image to be shared with the second terminal is selected from a photo album of the first terminal, an object selected by the user is an to-be-transmitted application data frame. For an application data frame that cannot be transmitted by using only one wireless packet, the application data frame may be fragmented. In actual application, a fragmentation threshold may be determined based on the maximum transmission capacity of a transmission link, and is not limited herein. If the data size of the application data frame does not exceed the fragmentation threshold, it indicates that data transmission can be completed by using only one wireless packet. If the data size of the application data frame exceeds the fragmentation threshold, it indicates that the application data frame cannot be transmitted by using only one wireless packet. Therefore, the application data frame needs to be fragmented, and then data fragments are transmitted to the second terminal.

S130: Perform data fragmentation on the application data frame, and store data fragments in a corresponding system memory space.

In this embodiment, the first terminal may perform data fragmentation on the application data frame at a D2D service layer, where the application data frame is fragmented through D2D, and a data header is added to each data fragment. The data header is used to instruct the second terminal to perform data reassembly on each data fragment after receiving the data fragment, so as to restore the application data frame.

Figure 8:
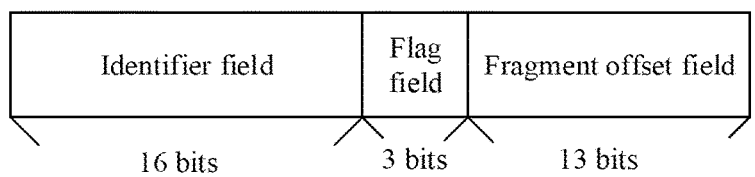
FIG. 8 is a schematic structural diagram of a data header of data on fragments in a data transmission method according to an embodiment of this application.

Here, as shown in FIG. 8, the data header may include an identifier field, a flag field and a fragment offset field. The flag field may occupy 3 bits, and the lowest bit thereof, MF (More Fragment), is used to distinguish the last fragment of the application data frame from other fragments. If the flag bit MF is 0, it indicates that the data fragment is the last data fragment of the application data frame; or if the flag bit MF is 1, it indicates that the data fragment is not the last data fragment of the application data frame. An identifier may occupy 16 bits, and is used by the second terminal to reassemble fragments of the application data frame into an original application data frame. When the application data frame is fragmented, a value of the identifier is copied to the identifier fields of all data fragments. In this way, the second terminal may correctly reassemble data fragments with the same identifier field value into an original data frame. The fragment offset field may occupy 13 bits, and the fragment offset field indicates an offset of a fragment from original data.

In addition, the data header may alternatively contain a fragment code corresponding to each data fragment, and the fragment code is used to identify the serial number of each fragment. During data reassembly, the fragment code may be used to determine whether data is missing and a reassembly order of fragments.

After a data header is added to each data fragment, a system memory space may be applied for each data fragment, and each data fragment is stored in a corresponding system memory space. When data is sent successfully, the corresponding system memory space is released.

S140: Store the application data frame in a corresponding system memory.

In this embodiment, the D2D service layer allocates a system memory space directly for an application data frame that does not need to be fragmented, and then stores the application data frame in the corresponding system memory space.

S150: Copy data stored in the system memory to a sending queue of a first communications module through a data bus.

In this embodiment, the data stored in the system memory is copied to a sending queue of the Wi-Fi chip through a system bus (for example, peripheral component interconnect express (Peripheral Component Interconnect Express, PCIE) and an SDIO bus) based on direct memory access (Direct Memory Access, DMA).

Specifically, for data fragments, the data fragments stored in fragmentation system memory space may alternatively be copied to the sending queue of the first communications module through a PCIE data bus.

S160: Send data in the sending queue to a second terminal in wireless communication with the first terminal through a communications port of the first communications module.

In this embodiment, the first communications module adds corresponding wireless network fields to the data in the sending queue based on the 802.11 MAC/PHY layer control protocol to generate a packet, and then the packet is sent to the second terminal through the communications port of the first communications module.

Specifically, if a first chip transmits data based on a 802.11 MAC/PHY layer protocol, corresponding wireless network fields (that is, an MAC head and a check trailer) may be added to the to-be-transmitted data at the Media Access Control (Media Access Control, MAC) layer to generate an MAC data frame, and then the MAC data frame is sent to the PHY (Physical) layer. A 1-bit error check code is added for every 4 bits of data received from the MAC layer, then parallel data is converted into serial data stream data. Then, the data is encoded based on encoding rules (NRZ encoding or Manchester encoding) at the PHY layer and converted into an analog signal for sending. It should be noted that a process of receiving data is a reversed process, that is, a decoding process. It should also be noted that, for a specific implementation of adding corresponding wireless network fields to the to-be-transmitted data to generate the MAC data frame, reference may made to the 802.11 MAC/PHY layer control protocol. Details are not described herein again.

S170: The first terminal monitors whether an acknowledgment frame returned by the second terminal is received within a preset time interval; if the acknowledgment frame returned by the second terminal is received within the preset time interval, it is determined that the data transmission is successful; or if the acknowledgment frame returned by the second terminal is not received within the preset time interval, S180 is performed.

Figure 9:
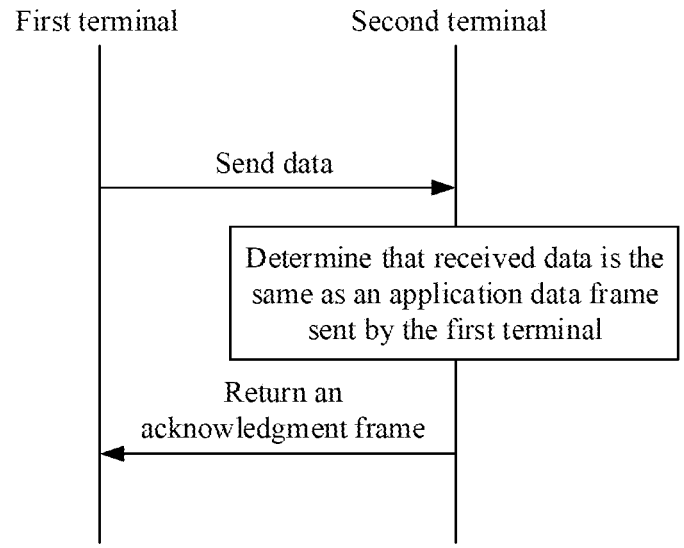
FIG. 9 is a schematic diagram of interaction in a data transmission acknowledgment process in a data transmission method according to this application.

FIG. 9 is a schematic diagram of interaction in a data transmission acknowledgment process. In this embodiment, to ensure error-free data transmission, after the first data sends data to the second terminal, the first terminal also needs to monitor whether an acknowledgment frame returned by the second terminal is received within a preset time interval. If the acknowledgment frame returned by the second terminal is received, it may be determined that the data has been successfully sent, and the system memory space previously allocated for the application data frame or data fragments may be released. After receiving the data from the first communications module of the first terminal, the second terminal checks the received data to check whether the received data is the same as the application data frame from the first terminal. If it is determined that the received data is the same as the application data frame from the first terminal, the second terminal will return an acknowledgment frame to the first terminal to notify that the first terminal has received the data. It should be noted that the preset time interval may be set based on an actual application scenario, and is not limited herein.

S180: The first terminal monitors whether a retransmission request frame returned by the second terminal is received within a preset time interval; if the retransmission request frame returned by the second terminal is received within the preset time interval, S190 is performed; or if the retransmission request frame returned by the second terminal is not received within the preset time interval, it is determined that a fault has occurred on a data link.

S190: The first terminal determines to-be-retransmitted data based on the retransmission request frame, sends the to-be-retransmitted data to the second terminal through the communications port of the first communications module, and returns to perform S170.

Figure 10:
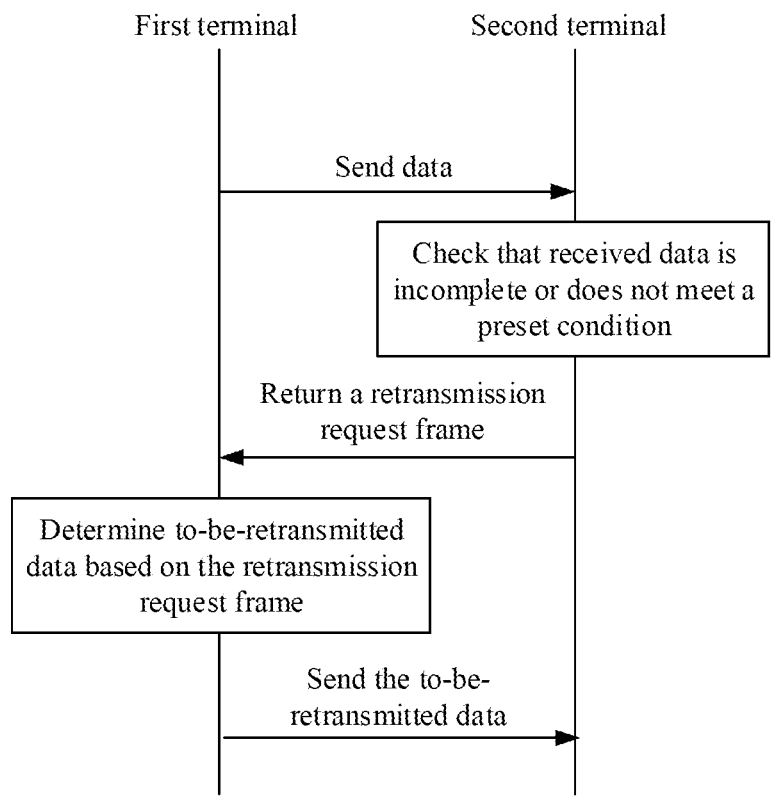
FIG. 10 is a schematic diagram of interaction in a data retransmission process in a data transmission method according to this application.

FIG. 10 is a schematic diagram of interaction in a data retransmission process. In this embodiment, after determining that the received data is incomplete or does not meet a preset condition, the second terminal returns a retransmission request frame to the first terminal. The first terminal determines the to-be-retransmitted data based on the retransmission request frame, then processes the to-be-retransmitted data by following steps S120 to S160, and sends the to-be-retransmitted data to the second terminal. Then, the first terminal returns to perform S170, that is, continues to monitor whether the acknowledgment frame returned by the second terminal is received within the preset time interval, so as to ensure the accuracy of the data.

Figure 11:
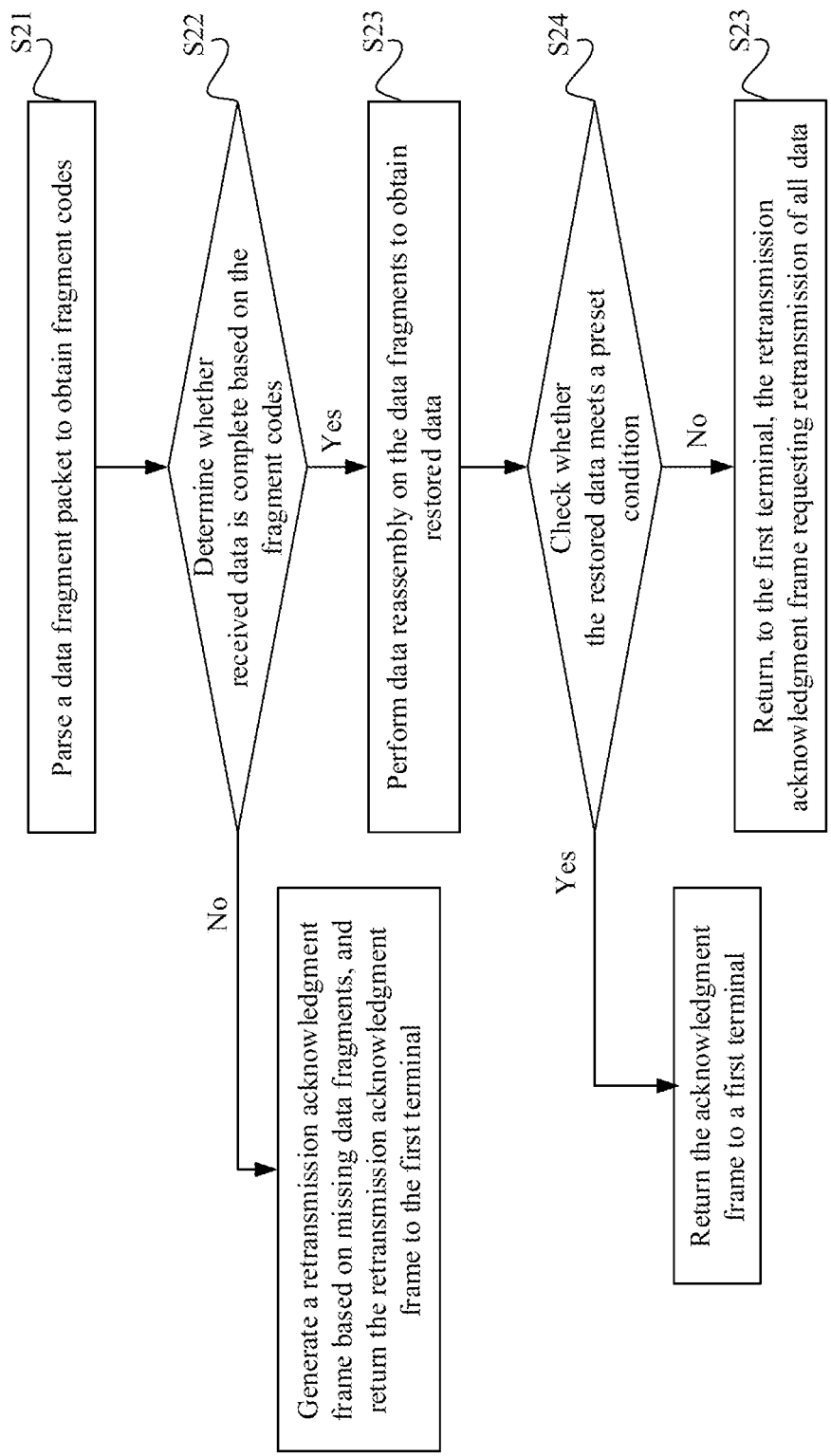
FIG. 11 is a schematic flowchart of a data reassembly process in a data transmission method according to this application.

In this embodiment, after receiving the data, the second terminal receives performs data reassembly on the fragmented data. FIG. 11 is a schematic flowchart of a data reassembly process. As shown in FIG. 11, the data reassembly process includes the following steps:

S21: Parse a data fragment packet to obtain fragment codes.

In this case, because each data fragment includes a data header and the data header contains a fragment code used to identify each data fragment, the fragment code of each data fragment can be determined by parsing the data header of each data fragment.

S22: Determine whether the received data is complete based on the fragment codes; if the received data is complete, S23 is performed; or if the received data is incomplete, a retransmission acknowledgment frame is generated based on missing data fragments, and the retransmission acknowledgment frame is returned to the first terminal.

In this case, whether the received fragmented data is complete can be determined based on the fragment codes. For example, the first terminal divides the application data frame into five data fragments, and sets the fragment code of a first data fragment to 1, the fragment code of a second data fragment to 2, the fragment code of a third data fragment to 3, the fragment code of a fourth data fragment to 4, and the fragment code of a fifth data fragment to 5. When the second terminal receives the data fragments with fragment codes 1, 3, 4 and 5, the second terminal can determine that the data fragment with fragment code 2 is missing. In this case, the second terminal generates a corresponding retransmission acknowledgment frame based on the missing data fragment, and then sends the retransmission acknowledgment frame to the first terminal to request the first terminal to re-send the data fragment with fragment code 2. When the second terminal receives the data fragments with fragment codes 1, 2, 3, 4 and 5, it can be determined that the data received by the first terminal is complete, and in this case, the received fragmented data may be reassembled.

S23: Perform data reassembly on the data fragments to obtain restored data.

Specifically, a process of data reassembly of data fragments may be performed at a D2D service layer of the second terminal. Data reassembly is performed based on a fragment number, an identifier field, a flag field, and a fragment offset field in the data header of each data fragment. The data fragments of the same application data frame are determined based on the flag field, then data segments in the data fragment are sequentially combined based on the fragment number and the fragment offset field, and whether a current data fragment is the last fragment of the application data frame is determined based on the identifier field. If the current data fragment is the last fragment of the application data frame, data reassembly is completed, or if the current data fragment is not the last fragment of the application data frame, data restoration continues based on the fragment number and the fragment offset field.

In this case, if the data reassembly fails, a data fragment resulting in the data reassembly failure is determined, then a corresponding retransmission acknowledgment frame is generated based on the data fragment, and the retransmission acknowledgment frame is sent to the first terminal to instruct the first terminal to send the data fragment again.

S24: Check whether the restored data meets a preset condition; if the restored data meets the preset condition, the acknowledgment frame is returned to the first terminal; or if the restored data does not meet the preset condition, S25 is performed.

S25: Return, to the first terminal, the retransmission acknowledgment frame requesting retransmission of all data.

In an implementation, after data reassembly, the data amount of the restored data may be compared with that of the application data frame sent by the first terminal; and if the data amount of the restored data is the same as that of the application data frame sent by the first terminal, it indicates that the restored data meets the preset condition.

In an implementation, whether the restored data meets the preset condition may alternatively be checked based on hash values; and if a hash value of the restored data is the same as a hash value of the application data frame sent by the first terminal, it indicates that the restored data meets the preset condition. It should be noted that the preset condition may be set based on actual application, and is not limited herein.

After the restored data is successfully checked (that is, the restored data meets the preset condition), an acknowledgment frame can be returned to the first terminal, so that the first terminal can confirm that data transmission is successful. If the restored data is not successfully checked (that is, the restored data does not meet the preset condition), the first terminal may be requested to retransmit all data again; that is, a retransmission acknowledgment frame requesting retransmission of all data may be generated, and then the retransmission acknowledgment frame is returned to the first terminal.

To illustrate the beneficial effects of the embodiments of this application, Table 1 shows time consumption statistics of conventional TCP/IP sending and receiving processes. As shown in Table 1, a statistical test for time delay of conventional TCP/IP sending and receiving processes shows that a 200 KB packet takes about 27 ms from sending to receiving, including about 7.8 ms for a protocol stack, accounting for about ⅓. With the data transmission method according to this embodiment of this application, time spent on the TCP/IP protocol stack is effectively saved because there is no need to encapsulate and decapsulate data through the TCP/IP protocol stack. That is, 7.8 ms can be saved on average when a 200 KB packet is sent by using the data transmission method according to this application.

TABLE 1

| Times of data transmission | Total time spent on analog 200 KB | Time spent on the TCP/IP protocol stack |
| --- | --- | --- |
| 1 | 34093 | 10519 |
| 2 | 25716 | 6283 |
| 3 | 23977 | 7093 |
| 4 | 23100 | 7871 |
| 5 | 26568 | 7229 |
| 6 | 34993 | 9911 |
| 7 | 24795 | 5910 |
| Average value | 27606 | 7830.857143 |

It can be learned that, according to a data transmission method provided in the embodiment, data in the system memory is copied to the sending queue of the first through the system bus, and then the data is sent to the second terminal by using the first communications module. Device to device communication, directly through system memory copying and MAC/PHY layer 2 forwarding, greatly optimizes load and delay of Wi-Fi packet forwarding, which can effectively reduce time spent on data transmission of device to device services, effectively reduce system load, reduce transmission delay, and increase the Wi-Fi throughput.

It may be understood that sequence numbers of the foregoing steps do not mean execution sequences in the embodiments. The execution sequences of the processes should be determined based on functions and internal logic of the processes, and should not be construed as any limitation on the implementation processes of the embodiments of this application.

Based on the same inventive concept, as an implementation of the method, an embodiment of this application provides a data transmission apparatus. The apparatus embodiment is corresponding to the foregoing method embodiment. For the convenience of reading, details in the method embodiment are not described in the apparatus embodiment again, but it should be clear that the apparatus in the embodiment can implement all the contents in the method embodiment correspondingly.

Figure 12:
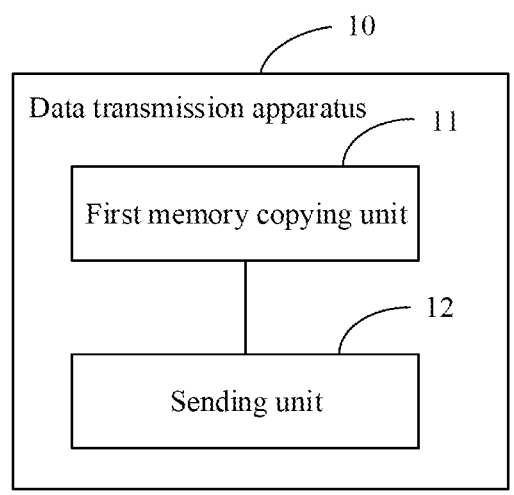
FIG. 12 is a structural block diagram of a data transmission apparatus according to an embodiment of this application.

FIG. 12 is a structural block diagram of a data transmission apparatus according to an embodiment of this application. The data transmission apparatus includes units configured to perform the steps in the foregoing embodiments. For details, refer to related descriptions in the foregoing embodiments. For ease of description only parts related to this embodiment of this application are shown. Referring to FIG. 12, the data transmission apparatus 10 includes a first system memory copying unit 11 and a sending unit 12.

The first system memory copying unit 11 is configured to copy an application data frame stored in a system memory to a sending queue of a first communications module through a data bus.

The sending unit 12 is configured to send the application data frame in the sending queue to a second terminal in device to device communication with the first terminal through a communications port of the first communications module.

In a possible implementation, the apparatus further includes a fragmentation unit.

The fragmentation unit is configured to fragment the application data frame if a data size of the application data frame exceeds a fragmentation threshold, and store data fragments in a corresponding system memory space;

correspondingly, the first system memory copying unit is configured to copy fragmented data from the system memory space storing the data fragments to the sending queue of the first communications module separately; and correspondingly, the sending unit is configured to send the data fragments to the second terminal successively through the communications port of the first communications module based on the sending queue.

In a possible implementation, the apparatus further includes a retransmission unit.

The retransmission unit is configured to: if a retransmission request frame is received from the second terminal, determine to-be-retransmitted data based on the retransmission request frame, and send the to-be-retransmitted data to the second terminal through the communications port of the first communications module, where the retransmission request frame is generated by the second terminal when it is determined that fragmented data is missing or reassembled data does not meet a preset condition.

In a possible implementation, the apparatus further includes a determining unit.

The determining unit is configured to determine that data transmission is successful if a data acknowledgment frame is received from the second terminal, where the data acknowledgment frame is generated by the second terminal after reassembling data based on the received data and determining that the data is complete and meets the preset condition.

In a possible implementation, the fragmentation unit is specifically configured to: if a data size of the application data frame exceeds the fragmentation threshold, fragment the application data frame into several data fragments based on the maximum data transmission length of a network, and add a data header to each data fragment, where the data header is used to instruct the second terminal to perform data reassembly on each data fragment after receiving the data fragment to restore the application data frame.

It can be learned that according to a data transmission apparatus provided in an embodiment of this application, data in a system memory can alternatively be copied to a sending queue of a first communications module through a system bus, and then the data is sent to a second terminal based on the first communications module. Device to device communication, directly through system memory copying and MAC/PHY layer 2 forwarding, greatly optimizes load and delay of Wi-Fi packet forwarding, which can effectively reduce time spent on data transmission of device to device services, effectively reduce system load, reduce transmission delay, and increase the Wi-Fi throughput.

Figure 13:
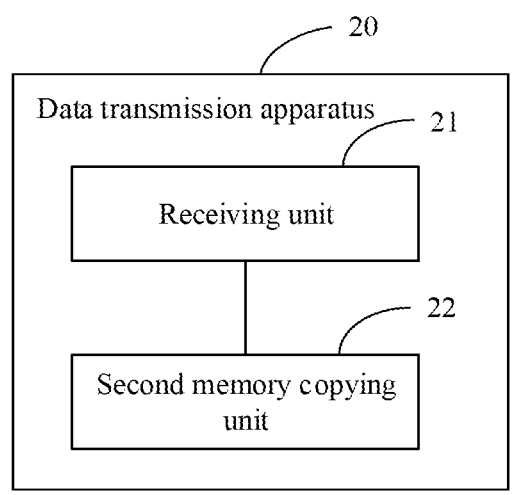
FIG. 13 is a structural block diagram of another data transmission apparatus according to an embodiment of this application.

FIG. 13 is a structural block diagram of another data transmission apparatus according to an embodiment of this application. As shown in FIG. 13, the data transmission apparatus 20 includes a receiving unit 21 and a second system memory copying unit 22.

The receiving unit 21 is configured to receive an application data frame, where the application data frame is copied by a first terminal in device to device communication with the second terminal from a system memory of the first terminal to a sending queue of a first communications module of the first terminal through a data bus of the first terminal, and the application data frame in the sending queue is sent to the second terminal through a communications port of the first communications module.

The second system memory copying unit 22 is configured to copy the application data frame to a system memory of the second terminal through a data bus of the second terminal.

In a possible implementation, the received application data frame includes several data fragments; and correspondingly, the apparatus further includes a reassembly unit. The reassembly unit is configured to perform data reassembly on the data fragments.

In a possible implementation, the apparatus further includes a retransmission acknowledgment unit.

The retransmission acknowledgment unit is configured to: if a data fragment is missing or reassembled data does not meet a preset condition, generate a retransmission request frame based on to-be-retransmitted data, and return the retransmission request frame to the first terminal, where the retransmission request frame is used to instruct the first terminal to resend the to-be-retransmitted data.

In a possible implementation, the apparatus further includes an acknowledgment returning unit.

The acknowledgment returning unit is configured to return an acknowledgment frame to the first terminal if the reassembled data is complete and as expected.

It can be learned that according to a data transmission apparatus provided in an embodiment of this application, received data can also be copied into a system memory directly through a system bus, so that application software can directly process the data stored in the system memory, thereby effectively reducing time spent on data transmission of device to device services, effectively reducing system load, reducing transmission delay, and increasing the Wi-Fi throughput.

Figure 14:
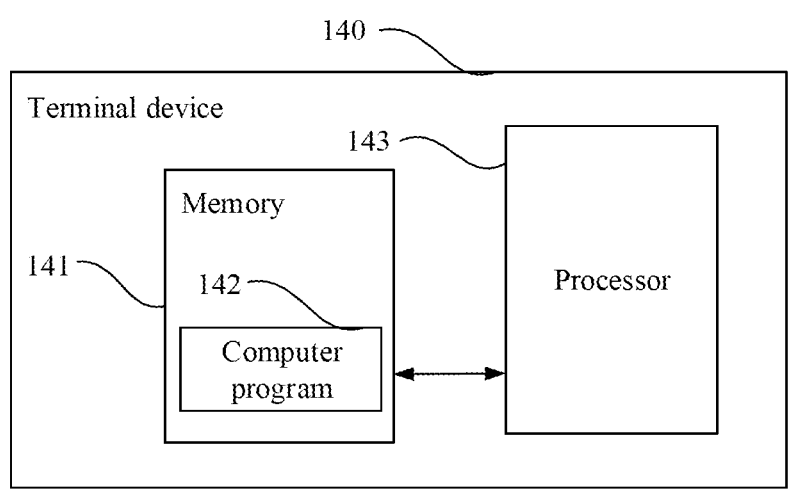
FIG. 14 is a schematic structural diagram of a terminal device according to an embodiment of this application.

Based on a same invention concept, an embodiment of this application further provides a terminal device. FIG. 14 is a schematic structural diagram of a terminal device according to an embodiment of this application. As shown in FIG. 14, the terminal device 140 in this embodiment includes at least one processor 143 (only one is shown in FIG. 14), a memory 141, and a computer program 142 that is stored in the memory 141 and capable of running on the at least one processor 143. The processor 143, when executing the computer program 142, implements the steps of the data transmission method in any one of the foregoing embodiments.

The terminal device 140 may be a desktop computer, a notebook computer, a personal digital assistant, or another device. The terminal device may include, but is not limited to, the processor 143 and the memory 141. It may be understood by a person skilled in the art that FIG. 14 is only an example of the terminal device 140 and does not constitute a limitation on the terminal device 140. The terminal device may include more or fewer components than those illustrated, or combine some components, or may include different components. For example, the terminal device may further include an input/output device, a network access device, and the like.

The processor 143 may be a central processing unit (Central Processing Unit, CPU), or the processor 143 may be another general-purpose processor, a digital signal processor (Digital Signal Processor, DSP), an application specific integrated circuit (Application Specific Integrated Circuit, ASIC), a field-programmable gate array (Field-Programmable Gate Array, FPGA) or another programmable logic device, a discrete gate or transistor logic device, a discrete hardware assembly, or the like. The general-purpose processor may be a microprocessor, or the processor may be any conventional processor.

In some embodiments, the memory 141 may be an internal storage unit of the terminal device 140, such as a hard disk or a system memory of the terminal device 140. In some other embodiments, the memory 141 may alternatively be an external storage device of the terminal device 114, such as a plug-in hard disk, a smart media card (Smart Media Card, SMC), a secure digital (Secure Digital, SD) card, a flash card (Flash Card) equipped on the terminal device 140. Further, the memory 141 may alternatively include both an internal storage unit of the terminal device 114 and an external storage device. The memory 141 is configured to store an operating system, an application, a boot loader (Boot Loader), data, and another program, such as program code of the computer program. The memory 141 may alternatively be configured to temporarily store data that has been output or will be output.

It should be noted that because information interaction between the apparatus and the unit, execution processes, and the like are based on the same concept as that in the method embodiments of this application, for specific functions and technical effects of this embodiment, reference may be made to the method embodiments. Details are not described herein again.

It may be clearly understood by a person skilled in the art that, for the purpose of convenient and brief description, division of the foregoing functional units and modules is used only as an example for illustration. In actual application, the foregoing functions may be allocated to different functional units and modules and implemented as needed, that is, an inner structure of the apparatus is divided into different functional units or modules to implement all or some of the functions described above. Functional units and modules in the embodiments may be integrated into one processing unit, or each of the units may exist alone physically, or two or more units are integrated into one unit. The integrated unit may be implemented in a form of hardware, or may be implemented in a form of a software functional unit. In addition, specific names of the functional units and modules are only for convenience of distinguishing from each other, and are not used to limit the protection scope of this application. For a detailed working process of the units and the modules in the foregoing system, reference may be made to a corresponding process in the foregoing method embodiments. Details are not described herein again.

An embodiment of this application further provides a computer readable storage medium, where the computer readable storage medium stores a computer program, and the computer program, when executed by a processor, may implement the steps in the data transmission method.

An embodiment of this application provides a computer program product, where when the computer program product runs on a terminal device, the terminal device is enabled to implement the steps in the data transmission method.

When the integrated unit is implemented in the form of a software functional unit and sold or used as an independent product, the integrated unit may be stored in a computer readable storage medium. Based on such an understanding, all or some of the processes in the methods according to the embodiments of this application may be completed by instructing related hardware by using a computer program. The computer program may be stored in a computer readable storage medium, and the computer program, when executed by a processor, may implement the steps in the foregoing method embodiments. The computer program includes computer program code, and the computer program code may be in the form of source code, object code, or executable files or in some intermediate forms. The computer readable medium may at least include: any entity or apparatus capable of carrying computer program code to a photographing apparatus/terminal device, a recording medium, a computer memory, a read-only memory (ROM, Read-Only Memory), a random access memory (RAM, Random Access Memory), an electrical carrier signal, a telecommunication signal, and a software distribution medium. For example, the computer readable medium may include a USB flash disk, a removable hard disk, a magnetic disk, or an optical disc. In some jurisdictions, based on legislative and patent practice, the computer readable medium may not be an electrical carrier signal or a telecommunication signal.

In the foregoing embodiments, descriptions of the embodiments have respective focuses. For a part that is not detailed or described in an embodiment, refer to related descriptions in other embodiments.

A person of ordinary skill in the art may be aware that, in combination with the examples described in the embodiments disclosed in this specification, units and algorithm steps can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

In the embodiments provided in this application, it should be understood that the disclosed apparatus/network device and method may be implemented in other manners. For example, the described apparatus/network device embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate components may be or may not be separated physically. The components shown as units may be or may not be physical units, that is, the units may be located at one place or may be distributed onto multiple network units. Some or all of the units may be selected according to actual needs to achieve the purpose of the solutions in the embodiments.

Finally, it should be noted that the foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

The invention claimed is:

1. A data transmission system includes a first terminal and a second terminal, wherein the first terminal includes a first communication module, and the data transmission system is configured for operations comprising:

establishing point-to-point communication between the first terminal and the second terminal;

obtaining, by the first terminal, an application data frame;

after the first terminal obtains the application data frame, copying, using direct memory access (DMA) by the first terminal, the application data frame to a sending queue of the first communication module through a data bus, wherein the first communication module is a WIFI chip;

generating, by the first communication module of the first terminal, a message, wherein the message is a message generated by the first communication module adding a wireless network field to the application data frame based on a MAC/PHY layer control protocol, and wherein the message is generated without encapsulation of the application data frame through TCP/IP protocols;

sending, by the first terminal, the message to the second terminal through the first communication module;

receiving, by the second terminal, the message;

parsing, by the second terminal, the received message to obtain the application data frame, wherein the copying, using direct memory access (DMA) by the first terminal, the application data frame to a sending queue of the first communication module through a data bus includes:

when a data size of the application data frame exceeds a fragmentation threshold, performing fragmentation processing on the application data frame and storing each fragment from the fragmentation processing in a respective memory space of the first terminal; and copying data fragments from each respective system memory space of the first terminal and storing the data fragments to the sending queue of the first communication module, wherein the sending, by the first terminal, the message to the second terminal through the first communication module includes:

sending, by the first terminal, the data fragments to the second terminal successively through the communication port of the first communication module based on the sending queue; and wherein the operations further comprise:

when a retransmission request frame is received from the second terminal. determining to-be-retransmitted data based on the retransmission request frame, and sending the to-be-retransmitted data to the second terminal through the communications port of the first communications module, wherein the retransmission request frame is generated by the second terminal when it is determined that fragmented data is missing or reassembled data does not meet a preset condition:

determining at data retransmission is successful if a data acknowledgement frame is received from the second terminal, wherein the data acknowledgment frame is generated by the second terminal after reassembling data based on the received data and determining that the data is complete and meets the preset condition.

2. The data transmission system according to claim 1, wherein the operations further comprise, after said parsing the received message to obtain the application data frame: passing the application data frame through a data bus of the second terminal by copying, using DMA, the application data frame to a system memory of the second terminal.

3. The data transmission system according to claim 1, wherein said sending, by the first terminal, the message to the second terminal through the first communication module, comprises:

sending, by the first terminal, data fragments to the second terminal sequentially through a communication port of the first communication module based on the sending queue.

4. The data transmission system according to claim 1, wherein the copying, using direct memory access (DMA) by the first terminal, the application data frame to a sending queue of the first communication module through a data bus comprises: performing the copying without encapsulating the application data frame using a transport layer protocol and without encapsulating the application data frame using a network layer protocol.

5. A data transmission method, applied to a first terminal, comprising:

establishing point-to-point communication with a second terminal;

obtaining an application data frame;

after the first terminal obtains the application data frame, copying, using direct memory access (DMA), the application data frame to a sending queue of a first communication module through a data bus, wherein the first communication module is a WIFI chip in the first terminal;

generating a message, wherein the message is a message generated by the first terminal adding a wireless network field to the application data frame based on a MAC/PHY layer control protocol, wherein the message is generated without encapsulation of the application data frame through TCP/IP protocols;

sending the message to the second terminal, wherein the copying, using direct memory access (DMA), the application data to a sending queue of the first communication module through a data bus includes;

when a data size of the application data frame exceeds a fragmentation threshold, performing fragmentation processing on the application data frame and storing each fragment from the fragmentation processing in a respective system memory space, and copying data fragments from each respective system memory space and storing the data fragments to the sending queue of the first communication module.

wherein the sending the message to the second terminal includes:

sending the data fragments to the second terminal successively through a communication port of the first communication module based on the sending queue; and wherein the operations further comprise:

when a retransmission request frame is received from the second terminal, determining to-be-retransmitted data based on the retransmission request frame, and sending the to-be-retransmitted data to the second terminal through the communications port of the first communications module, wherein the retransmission request frame is generated by the second terminal when it is determined that fragmented data is missing or reassembled data does not meet a preset condition;

determining that data retransmission is successful if a data acknowledgment frame is received from the second terminal, wherein the data acknowledgment frame is generated by the second terminal after reassembling data based on the received data and determining that the data is complete and meets the preset condition.

6. The method according to claim 5, wherein the sending the message to the second terminal includes sending the message to the second terminal through the communication port of the first communication module.

7. The data transmission method according to claim 5, wherein sending the message to the second terminal comprises:

sending data fragments to the second terminal sequentially through a communication port of the first communication module based on the sending queue.

8. The data transmission method according to claim 5, wherein the copying, using direct memory access (DMA), the application data frame to a sending queue of the first communication module through a data bus comprises: performing the copying without encapsulating the application data frame using a transport layer protocol and without encapsulating the application data frame using a network layer protocol.

9. A terminal device comprising a memory and a processor, wherein the memory is used to store a computer program; the processor is configured to perform operations comprising:

establishing point-to-point communication with a second terminal;

obtaining an application data frame;

after obtaining the application data frame, copying, using direct memory access (DMA), the application data frame to a sending queue of a communication module through a data bus, wherein the communication module is a WIFI chip in the terminal device;

generating a message, wherein the message is a message generated by the first-terminal device adding a wireless network field to the application data frame based on a MAC/PHY layer control protocol, and wherein the message is generated without encapsulation of the application data frame through TCP/IP protocols;

sending the message to the second terminal, wherein the copying, using direct memory access (DMA), the application data to a sending queue of the first communication module through a data bus includes:

when a data size of the application data frame exceeds a fragmentation threshold, performing fragmentation processing on the application data frame and storing each fragment from the fragmentation processing in a respective system memory space; and copying data fragments from each respective system memory space and storing the data fragments to the sending queue of the first communication module, wherein the sending the message to the second terminal includes:

sending the data fragments to the second terminal successively through communication port of the first communication module based on the sending queue; and wherein the operations further comprise:

when a retransmission request frame is received from the second terminal determining to-be-retransmitted data based on the retransmission request frame, and sending the to-be-retransmitted data to the second terminal through the communications port of the first communications module, wherein the retransmission request frame is generated by the second term: al when it is determined that fragmented data is missing or reassembled data does not meet preset condition:

determining retransmission is successful a data acknowledgment frame is received from the second terminal, wherein the data acknowledgment frame is generated by the second terminal after reassembling data based on the received data and determining that the data is complete and meets the preset condition.

10. The terminal device according to claim 9, wherein the sending the message to the second terminal includes sending the message to the second terminal through the communication port of the first communication module.

11. The terminal device according to claim 9, wherein sending the message to the second terminal comprises:

sending the data fragments to the second terminal sequentially through the communication port of the first communication module based on the sending queue.

12. The terminal device according to claim 9, wherein the copying, using direct memory access (DMA), the application data frame to a sending queue of the first communication module through a data bus comprises: performing the copying without encapsulating the application data frame using a transport layer protocol and without encapsulating the application data frame using a network layer protocol.

* * * * *